US012645406B2

(12) United States Patent
Song et al.

(10) Patent No.: US 12,645,406 B2
(45) Date of Patent: Jun. 2, 2026

(54) MEMORY SYSTEM FOR SECURE READ AND WRITE OPERATIONS BASED ON PREDEFINED DATA PATTERNS

(71) Applicant: Rambus Inc., San Jose, CA (US)

(72) Inventors: Taeksang Song, San Jose, CA (US); Evan Lawrence Erickson, Chapel Hill, NC (US); Wendy Elsasser, Austin, TX (US)

(73) Assignee: RAMBUS INC., San Jose, CA (US)

( * ) Notice: Subject to any disclaimer, the term of this patent is extended or adjusted under 35 U.S.C. 154(b) by 52 days.

(21) Appl. No.: 18/497,860

(22) Filed: Oct. 30, 2023

(65) Prior Publication Data

US 2024/0160388 A1      May 16, 2024

Related U.S. Application Data

(60) Provisional application No. 63/383,220, filed on Nov. 10, 2022.

(51) Int. Cl.
| | |
|---|---|
| *G06F 3/06* | (2006.01) |
| *G06F 12/02* | (2006.01) |
| *G06F 12/14* | (2006.01) |

(52) U.S. Cl.
CPC .......... *G06F 3/0689* (2013.01); *G06F 3/0623* (2013.01); *G06F 3/0656* (2013.01); *G06F 3/0659* (2013.01)

(58) Field of Classification Search
CPC .... G06F 3/0689; G06F 3/0623; G06F 3/0656; G06F 3/0659

USPC ........................................................ 711/114
See application file for complete search history.

(56) References Cited

U.S. PATENT DOCUMENTS

| | | | |
|---|---|---|---|
| 9,946,661 B2 | 4/2018 | Tseng et al. | |
| 11,264,063 B2 | 3/2022 | Chen et al. | |
| 2010/0191982 A1* | 7/2010 | Goto ....................... | G06F 21/72 |
| | | | 713/192 |
| 2013/0179733 A1* | 7/2013 | Frank .................... | G06F 11/261 |
| | | | 714/E11.167 |
| 2016/0299525 A1* | 10/2016 | Cho .......................... | G06F 1/10 |
| 2017/0076768 A1* | 3/2017 | Son ..................... | G06F 13/1673 |
| 2019/0369912 A1* | 12/2019 | Steinmetz .............. | G06F 3/061 |
| 2021/0279242 A1 | 9/2021 | Bell et al. | |
| 2023/0333771 A1* | 10/2023 | Armangau ............ | G06F 3/0659 |

* cited by examiner

*Primary Examiner* — Prasith Thammavong
*Assistant Examiner* — Sidney Li
(74) *Attorney, Agent, or Firm* — Amsel IP Law PLLC; Jason Amsel

(57) ABSTRACT

A memory buffer device facilitates secure read and write operations associated with data that includes a predefined data pattern. For read operations, the memory buffer device detects a read data pattern in the read data that matches a predefined data pattern. The memory buffer device may then generate a read response that includes metadata identifying the read data pattern without sending the read data itself. The memory buffer device may also receive Write Request without Data (RwoD) commands from the host that include metadata identifying a write data pattern. The memory buffer device identifies the associated data pattern and writes the data pattern or the metadata to the memory array. The memory buffer device may include encryption and decryption logic for communicating the metadata in encrypted form.

17 Claims, 6 Drawing Sheets

Memory System <u>100</u>

MEMORY SYSTEM FOR SECURE READ AND WRITE OPERATIONS BASED ON PREDEFINED DATA PATTERNS

CROSS-REFERENCE TO RELATED APPLICATIONS

This application claims the benefit of U.S. Provisional Application No. 63/383,220 filed on Nov. 10, 2022, which is incorporated by reference herein.

BACKGROUND

In a memory system, a host facilitates read and write operations associated with one or more memory devices. The architecture of the memory system may be designed to meet performance criteria relating to latency, power consumption, and data security associated with such operations.

BRIEF DESCRIPTION OF THE DRAWINGS

The teachings of the embodiments herein can be readily understood by considering the following detailed description in conjunction with the accompanying drawings.

DETAILED DESCRIPTION

A memory buffer device facilitates secure read and write operations associated with data that may include predefined data patterns. For read operations, the memory buffer device detects when the memory address associated with a read command includes a read data pattern from a set of predefined data patterns. The memory buffer device may then generate a read response that includes metadata identifying the read data pattern without sending the read data itself. The memory buffer device may also receive Write Request without Data (RwoD) commands from the host that include metadata identifying a write data pattern. The memory buffer device identifies the associated data pattern and writes the data pattern or the metadata to the memory array. The memory buffer device may include encryption and decryption logic to enable the memory buffer device to communicate with the host over a secure communication link that transmits the metadata (and optionally, the full commands and responses) in encrypted form.

Figure 1:
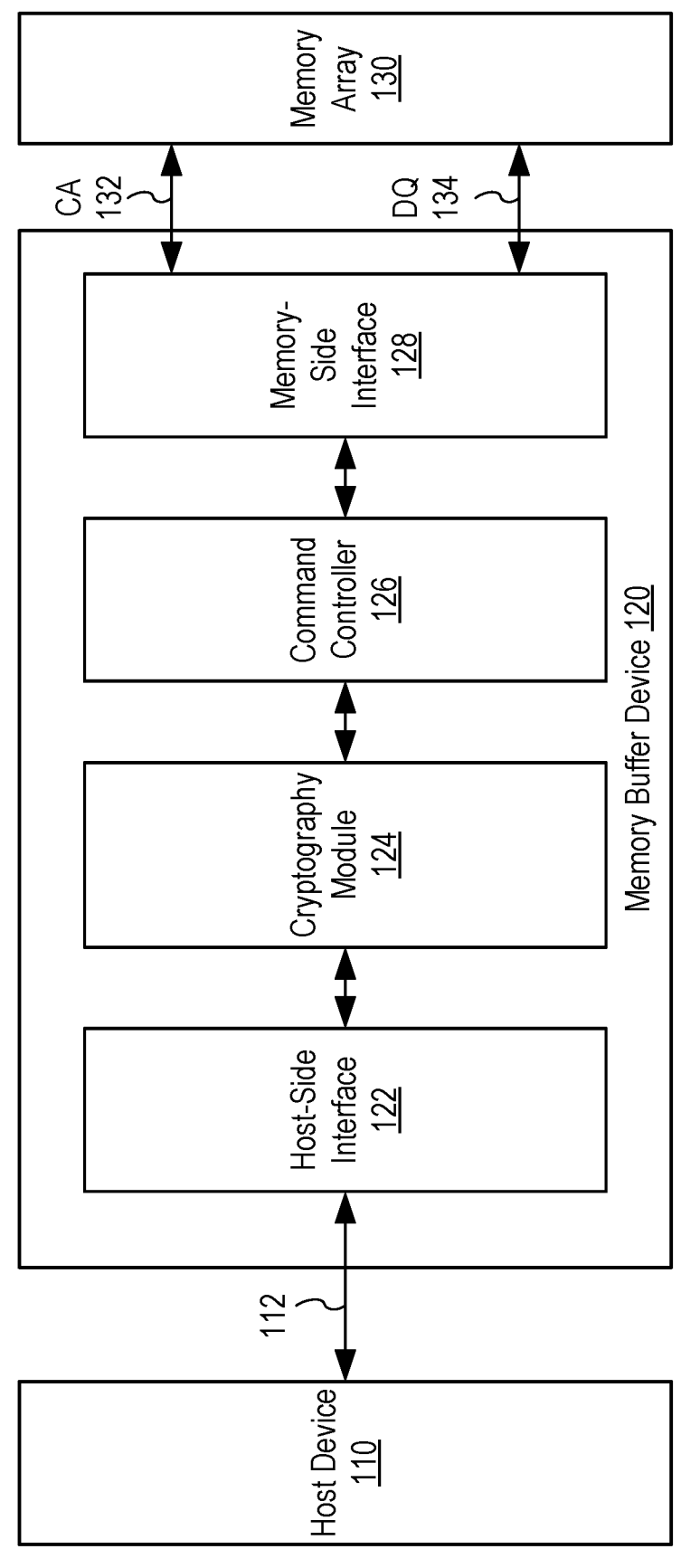
FIG. 1 is a block diagram illustrating an example embodiment of a memory system.

FIG. 1 illustrates an embodiment of a memory system 100 comprising a host device 110, a memory buffer device 120, and a memory array 130. The host device 110 communicates with the memory buffer device 120 over a secure communication link 112 for facilitating various memory operations of the memory array 130. In an embodiment, the secure communication link 112 comprises a serial link that communicates packetized commands and data between a host device 110 and a remote memory buffer device 120. For example, the communication link 112 may comprise a serial-attached memory interface such as a Compute Express Link (CXL) interface, an Open Memory Interface (OMI), a Coherent Accelerator Processor Interface (CAPI), a Peripheral Component Interconnect Express (PCIe) interface, or other interfaces. In another embodiment, the communication link 112 may comprise a double data rate (DDR) Dynamic Random-Access Memory (DRAM) interface or other memory interface for communicating between a locally connected host device 110 (such as a memory controller) and a memory buffer device 120 that may be integrated with a memory device or memory module. For example, the host device 110, memory buffer device 120, and memory array 130 may reside on the same printed circuit board. In an embodiment, at least some of the signals communicated over the communication link 112 may be optionally encrypted, scrambled, or otherwise obfuscated for security.

The memory buffer device 120 and the memory array 130 may comprise separate integrated circuits (e.g., of a memory module) or may be integrated on a single chip. Although FIG. 1 illustrates only a single memory buffer device 120 and memory array 130, various embodiments may include a memory buffer device 120 that interoperates with multiple memory arrays 130 and/or a host device 110 that interoperates with multiple memory buffer devices 120. For example, a host device 110 in a CXL environment may communicate with multiple CXL modules, each comprising one or more memory buffer devices 120, which correspondingly interoperate with one or more memory arrays 130. In a local memory system, the host device 110 may control multiple memory buffer devices 120 and/or memory arrays 130 that may be embodied in one or more memory modules (e.g., a dual-inline memory module (DIMM)).

The memory array 130 may comprise a DRAM (dynamic random-access memory) (or a set of DRAMs) that communicates with the memory buffer device 120 over at least a command/address (CA) link 132 and a data (DQ) link 134. The DRAM may include various other ports associated with timing and configuration signals that are omitted from FIG. 1. In a memory write operation, the memory array 130 receives a memory write command including a memory address from the CA link 132 and receives write data on the DQ link 134. The memory array 130 stores the received write data to the memory address specified in the memory write command. In a memory read operation, the memory array 130 receives a read command including a memory address via the CA link 132, and outputs read data stored at the memory address to the DQ link 134. The memory array 130 may furthermore perform other operations responsive to commands received from the CA link 132 such as refresh operations, precharge operations, mode register read and write operations, and other memory operations.

The memory buffer device 120 includes a host-side interface 122, a cryptography module 124, a command controller 126, and a memory-side interface 128. The host-side interface 122 comprises one or more ports for communicating commands, command responses, and data between the host device 110 and the memory buffer device 120. In a CXL-based system, the host-side interface 122 may packetize outgoing signals for sending to the host device 110 and depacketize incoming signals received from the host device 110. In a local memory system, the host-side interface 122 may comprise a set of ports for communicating with a memory controller such as a CA port, DQ port, and various timing/control ports.

The cryptography module 124 performs encryption and decryption operations to decrypt incoming encrypted data for writing to the memory array 130 in write operations and to encrypt outgoing data read from the memory array 130 in read operations. The cryptography module 124 may decrypt and/or encrypt both data and commands communicated over the communication link 112 or may decrypt and/or encrypt only data and metadata portions of the commands (e.g., command headers), without necessarily decrypting and/or encrypting commands in full. In an embodiment, the cryptography module 124 may be configurable (e.g., via an internal register or via an external command) to turn encryption/decryption on or off, to control the type of encryption/decryption, and/or to control various encryption/decryption parameters. In an embodiment, the cryptography module 124 can be optionally omitted.

The command controller 126 receives and decodes incoming host-side commands from the host device 110, facilitates memory operations with the memory array 130 associated with those commands, and generates command responses associated with commands. The host-side commands may include standard write request with data (RwD) commands, write request without data (RwoD) commands, and read (RD) commands. For a RwD command, the command controller 126 receives the RwD command (which includes a memory address) and write data for writing to the memory array 130. The command controller 126 generates a memory write command (with the memory address) for issuing to the memory array 130.

The host-side RwoD commands may be employed when data for writing to the memory array 130 includes one or more predefined data patterns. Examples of predefined data patterns include a pattern of all zeros, a pattern of all ones, a pattern of alternating ones and zeros, or any other arbitrary data pattern configured for RwoD operations. To execute an RwoD command, the command controller 126 receives the RwoD command without expressly receiving write data. The RwoD command specifies a memory address and write pattern metadata that identifies a write data pattern for associating with the memory address. For example, the metadata may comprise a data pattern flag encoded in a command packet header that references a specific write data pattern from a set of predefined data patterns. The metadata may optionally comprise a length flag that specifies a length of the write data pattern. For example, the length flag may specify a range of memory addresses, a number of data blocks, a number of repetitions of the data pattern, or other indicator. Alternatively, the length flag may be omitted and the metadata may instead reference a predefined data pattern of fixed length.

In an embodiment, the command controller 126 associates the write data pattern with the memory address by generating memory commands to expressly write the write data pattern to the memory address of the memory array 130. In another embodiment, the command controller 126 may instead write the metadata indicative of the write data pattern to the specified memory address, without expressly writing the write data pattern itself. In yet another embodiment, the command controller 126 may write the memory address and the metadata indicative of the write data pattern to a special memory location in the memory array 130 or in the memory buffer device 120 that stores a mapping between the memory address and the metadata.

For a host-side RD command, the command controller 126 receives the RD command (which includes a memory address) and determines if the memory address is associated with a predefined data pattern. For example, in one embodiment, the command controller 126 reads from the memory address (e.g., by issuing a memory read command), and then determines if the received data matches a predefined data pattern. Alternatively, the command controller 126 detects that the memory address is associated with a predefined data pattern by detecting that metadata is stored at the memory address or that metadata is associated with the memory device in a separate mapping. The command controller 126 may then issue a no data read response (NDRR) that includes the metadata, without expressly outputting the data pattern. For example, the NDRR may comprise a flag for including in a data packet header of a read response sent to the host device 110 via the communication link 112. If the command controller 126 does not detect any predefined data pattern associated with the memory address, then the command controller 126 may generate a standard data response (DRS) to the host device 110 that includes the read data.

Figure 2:
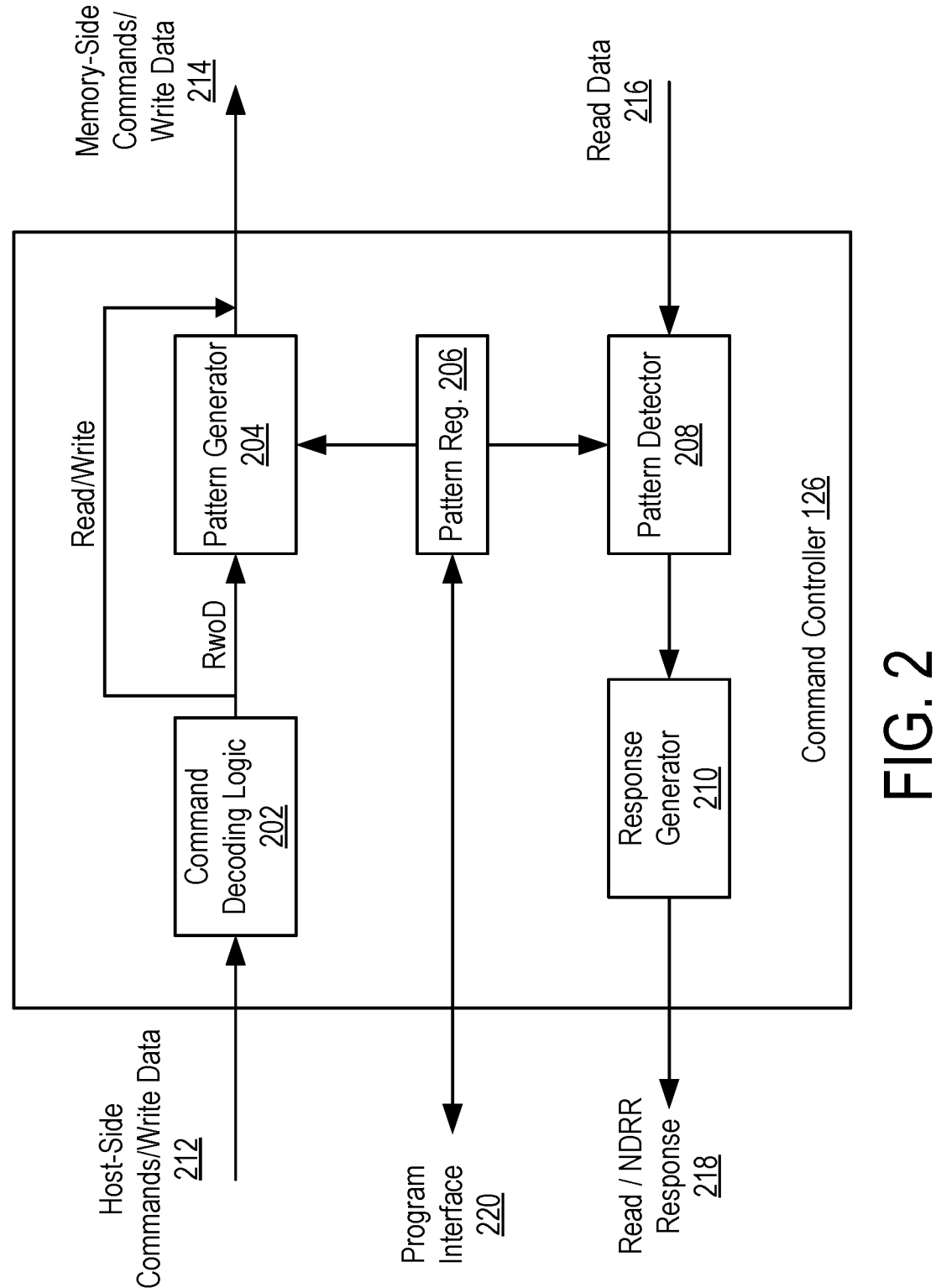
FIG. 2 is a block diagram illustrating a first example embodiment of a command controller of a memory buffer device.

The memory-side interface 128 comprises a set of ports for communicating with the memory array 130. For example, the memory-side interface 128 may include at least a CA port for communicating memory write and memory read commands to the memory array 130 over the CA link 132 and a DQ port for communicating write data and read data over the DQ link FIG. 2 is a first example embodiment of a command controller 126. In this embodiment, the command controller 126 includes command decoding logic 202, a pattern generator 204, a pattern register 206, a pattern detector 208, and a response generator 210. The command decoding logic 202 receives and decodes host-side commands and write data 212 (that have been decrypted by the cryptography module 124) to detect the type of command. When an RwoD command is detected, a pattern generator 204 identifies metadata in the RwoD indicative of a write data pattern and maps the metadata to a predefined data pattern in the pattern register 206. The pattern generator 204 generates the write data based on the mapped data pattern. For a host-side RD or RwD command, the pattern generator 204 may be bypassed. The command controller 126 provides the memory-side command and write data (which may include locally generated write data mapped from metadata) to the memory-side interface 128 for issuing to the memory array 130.

For a host-side RD command 212, a pattern detector 208 receives read data 216 from the memory array 130 (via the memory-side interface 128) and compares the read data 216 to the set of predefined data patterns in the pattern register 206 to detect matches. If a match is detected, the response generator 210 may issue a NDRR 218 that includes metadata indicative of the matched data pattern, without expressly outputting the read data pattern. Otherwise, if the pattern detector 208 does not detect a match, the response generator 210 may issue a standard DRS read response that includes the read data 216.

The command controller 126 may furthermore include a programming interface 220 for programming the pattern register 206. In some embodiments, the programming interface 220 may program additional aspects of the command controller 126 or other aspects of the memory buffer device 120 such as the type of encryption or various encryption parameters.

Figure 3:
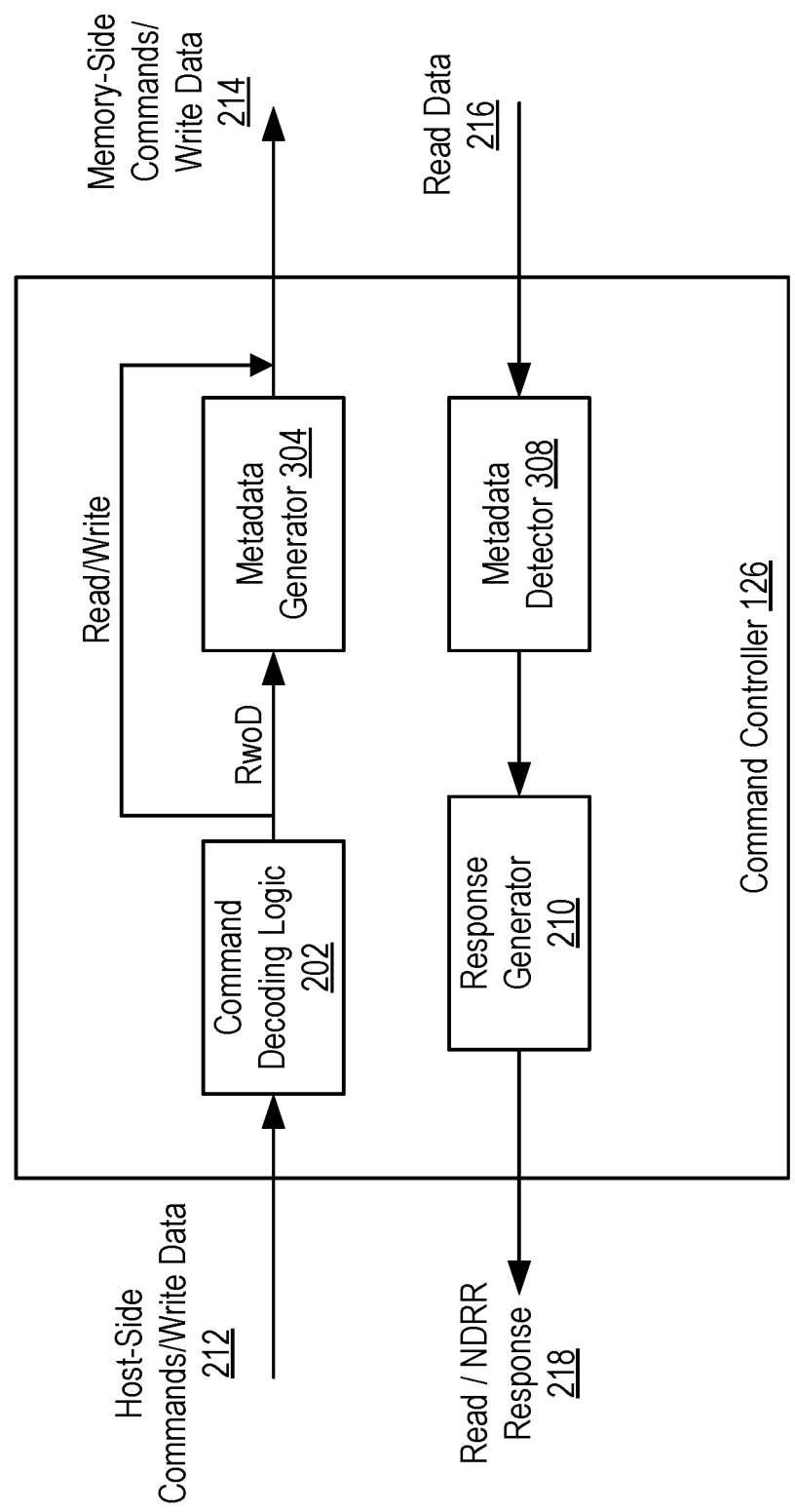
FIG. 3 is a block diagram illustrating a second example embodiment of a command controller of a memory buffer device.

FIG. 3 illustrates another embodiment of the command controller 126. In this embodiment, the command controller 126 does not include the pattern generator 204, pattern detector 208, or pattern register 206 and instead read/writes the metadata directly without mapping to or from the data patterns. For example, in response to an RwoD command, a metadata generator 304 obtain metadata from the RwoD command indicative of a write data pattern and generates a memory write command to write the metadata to the memory array 130. For a RD command 212, a metadata detector 308 detects when the read data 216 includes metadata and a response generator 210 generates a NDRR including the metadata.

Figure 4:
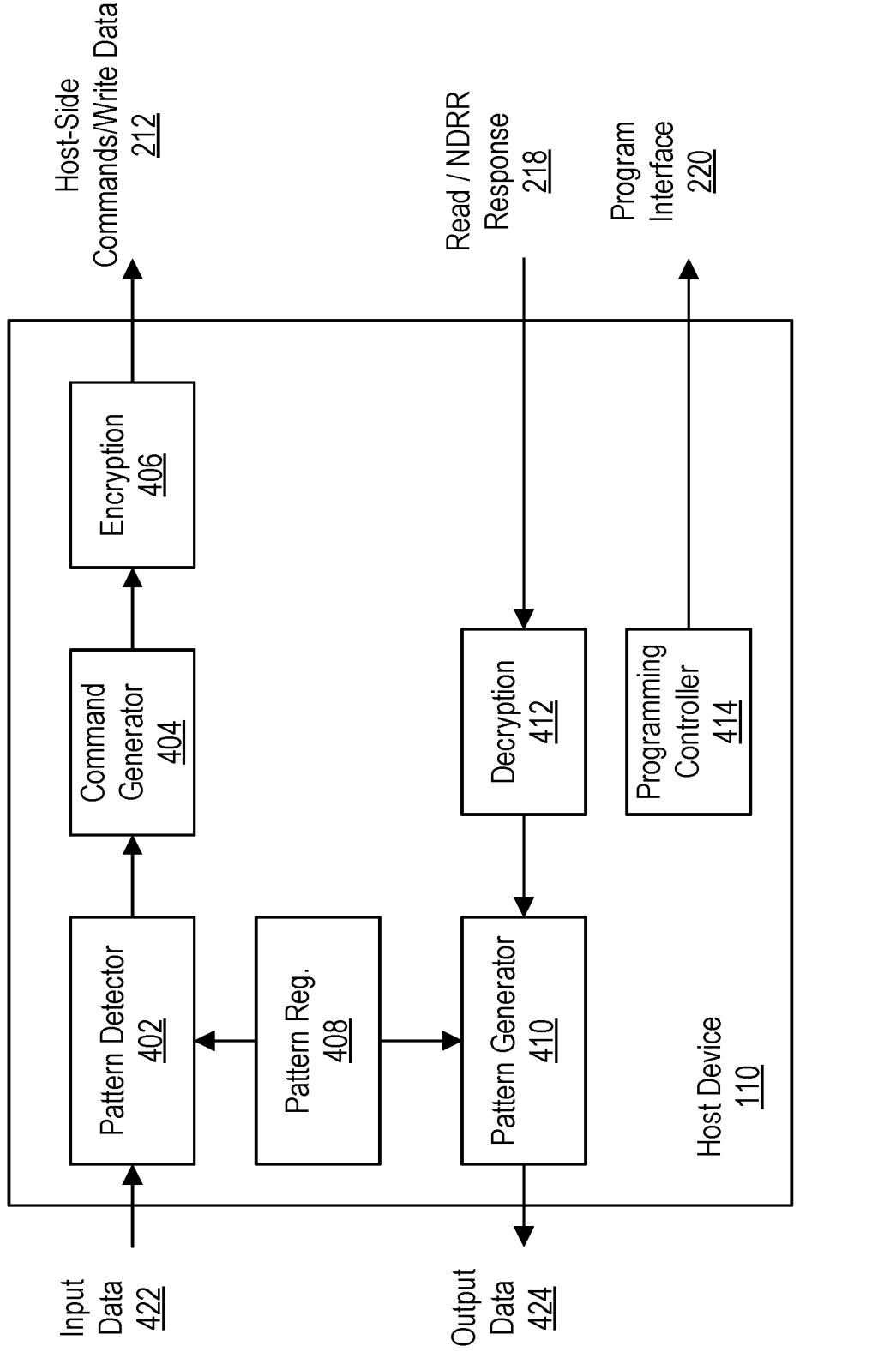
FIG. 4 is a block diagram illustrating an example embodiment of a host device of a memory system.

FIG. 4 is an example embodiment of a host device 110 that interoperates with the above-described memory buffer device 120. In a write path, a pattern detector 402 receives input data 422 and identifies patterns in the input data 422 that correspond to one or more predefined data patterns in the pattern register 408. A command generator 404 generates host-side RwD and/or RwoD commands for sending to the memory buffer device 120. Where one or more predefined data patterns are detected in the input data 422 the command generator 404 may generate a RwoD command that includes metadata associated with the detected data pattern without including the data pattern itself. If no pattern is detected, the command generator 404 may instead generate a RwD command and the write data. The encryption logic 406 optionally encrypts at least the write data and metadata (and optionally the full commands) 212 for transmitting over the communication link 112.

In a read path, decryption logic 412 decrypts read data and/or metadata from read responses 218 received over the communication link 112 (if received in encrypted form). A pattern generator 410 maps metadata to predefined data patterns in the pattern register 408 and generates output data 424 including the read data and detected data patterns. In an embodiment, the encryption logic 406 and decryption logic 412 may be optionally omitted.

The host device 110 may furthermore include a programming controller 414 that may communicate with the memory buffer device 120 over the programming interface 220 to program the pattern register 206 of the memory buffer device 120 and/or perform other configuration functions relating to encryption/decryption or memory operations.

Figure 5:
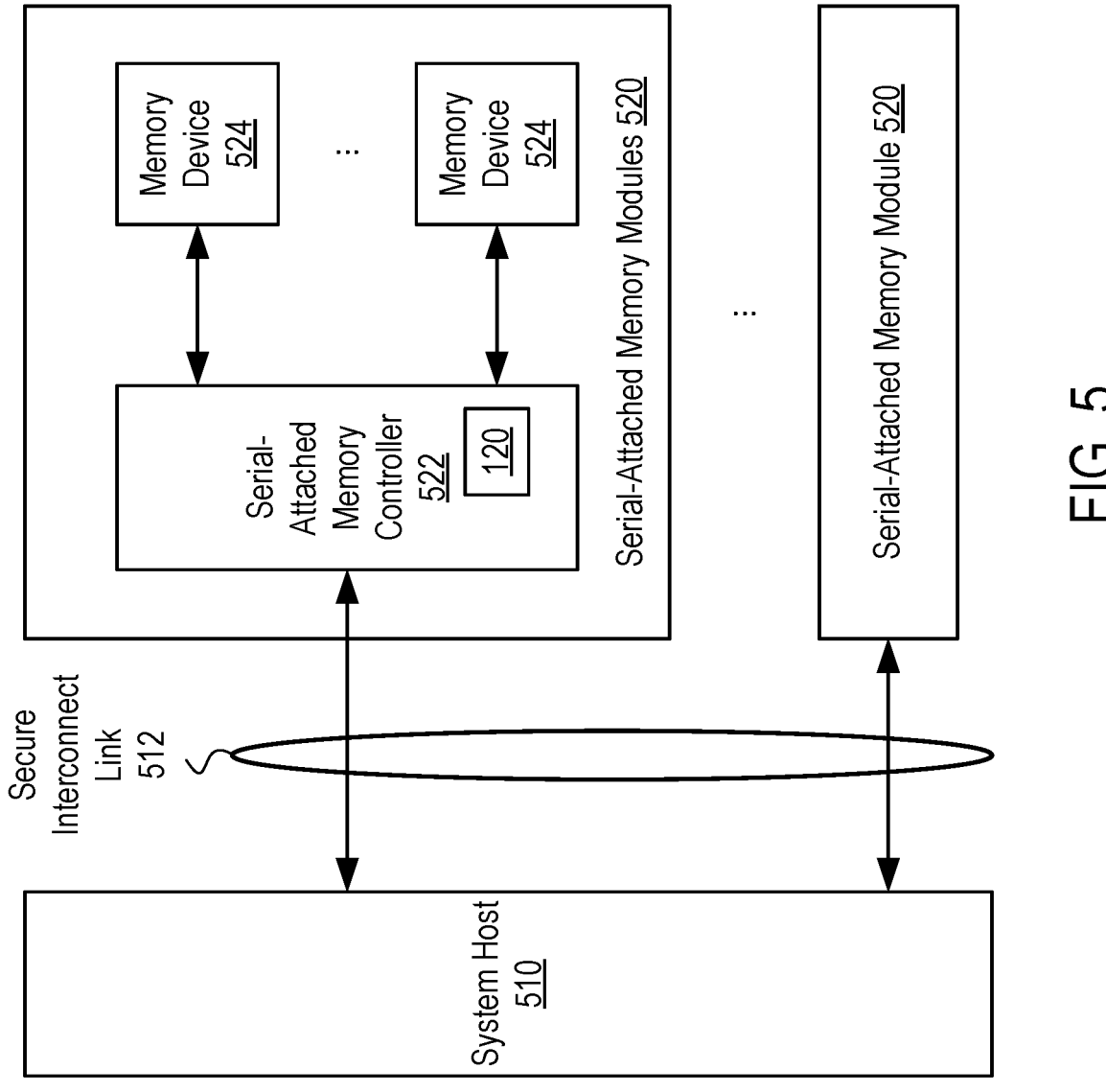
FIG. 5 is a block diagram illustrating an example embodiment of a serial-attached memory system.

FIG. 5 is a first example configuration of a memory system 500 that includes the above-described memory buffer device 120. In this embodiment, the host device 110 comprises a system host 510 that communicates packetized commands and data with a plurality of serial-attached memory modules 520 over a secure interconnect link 512. In an embodiment, the memory system 500 may comprise a disaggregated memory system in which the serial-attached memory modules 520 are remote and distributed relative to the system host 510. Each serial-attached memory module 520 includes a serial-attached memory controller 522 that incorporates the memory buffer device 120 and controls one or more memory devices 524. Here, the memory devices 524 may comprise conventional DRAM devices that interface with the serial-attached memory controller 522 using a conventional DRAM interface (e.g., CA and DQ links). The memory buffer device 120 is capable of receiving encrypted RwoD commands over the secure interconnect link 512 and writing to the memory devices 524 using conventional memory write commands as described above. Furthermore, the memory buffer device 120 may perform standard read operations from the memory devices 524 and, where appropriate, generate encrypted NDRRs to the system host 510 over secure interconnect link 512.

Figure 6:
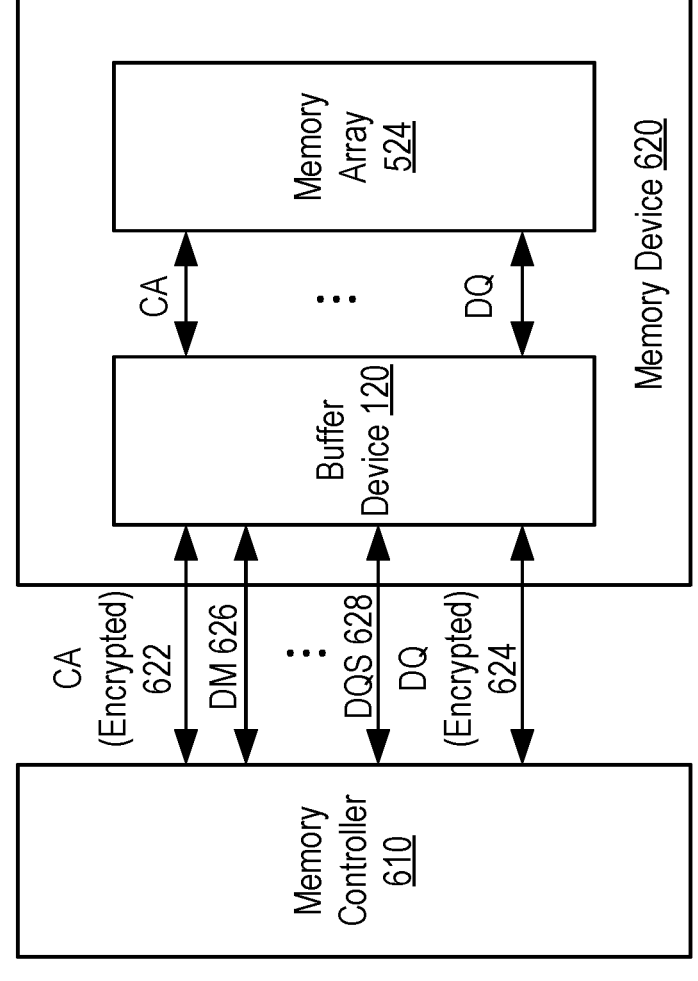
FIG. 6 is a block diagram illustrating an example embodiment of a local memory system.

FIG. 6 is a second example configuration of a memory system 600 with the above-described memory buffer device 120. In this embodiment, the host device 110 may comprise a memory controller 610 that communicates with a memory device 620 including the memory buffer device 120 and a memory array 524. In an embodiment, the memory buffer device 120 and memory array 524 may be integrated on a single chip. Alternatively, the memory buffer device 120 and the memory array 524 may be separate chips of a memory module on a printed circuit board.

The memory controller 610 is capable of performing conventional read and write operations, and processing RwoD commands and NDRR responses. Furthermore, the memory controller 610 may include encryption and decryption logic to enable encryption and decryption of signals over the CA and DQ links 622, 624. In this embodiment, RwoD commands may be communicated over the CA link 622 without sending data over the DQ link 624. Furthermore, NDRR responses may be sent over the CA link 622 without communicating read data over the DQ link 624. The DQ link 624 may be employed to communicate write data and read data associated with conventional read and write operations.

In an embodiment, reads and writes associated with certain data patterns may be implemented using a data copy function of the memory controller 610 and memory device 620. Here, when a predefined data pattern is detected by the memory buffer device 120 in response to a read operation, the memory buffer device 120 may output a value (e.g., zero or one) on a single DQ line (e.g., DQ0) 624 to indicate a selection between two predefined data patterns (e.g., all zeros or all ones) and assert a data masking pin 626 (e.g., DM=0) to indicate a read copy operation to the memory controller 610. The memory controller 610 detects that the data masking pin 626 is asserted and copies the value on the single DQ line (DQ0) to all other bits of a byte. In other embodiments, multiple DQ lines 624 may be to enable selection between different numbers of predefined data patterns.

In another embodiment, the memory buffer device 120 may toggle one or more DQS (DQ strobe) lines 628 (which generally operate as a timing signal associated with the DQ signals in conventional memory operations) while asserting the data masking pin 626 to indicate a predefined data pattern, where different toggle counts map to different predefined data patterns. The memory controller 610 may detect when the data making pin 626 is asserted in response to a read operation, count the number of toggles on one or more DQS lines 628, and then map the count of edges to a predefined data pattern.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A memory buffer device, comprising:
   a host-side interface to receive, from a host device via a packetized serial communication link, a host-side read command including a read memory address and to output a read response to the host device via the packetized serial communication link;

a memory-side interface to communicate with a memory device, the memory-side interface including a data interface and a command/address interface; and a command controller to issue a memory-side read command including the read memory address to the memory device via the command/address interface, to receive output data from the memory device via the data interface in response to the memory-side read command, to determine if the output data corresponds to a read data pattern from a set of predefined data patterns, and to generate the read response for sending to the host device via the host-side interface as packetized serial communication data, wherein the read response includes read pattern metadata in a data packet header that identifies the read data pattern when the output data corresponds to the read data pattern, and wherein the read response includes the output data from the read memory address when the output data does not correspond to any of the set of predefined data patterns.

2. The memory buffer device of claim 1, wherein the read pattern metadata further identifies a length of the read data pattern.

3. The memory buffer device of claim 1, wherein the command controller comprises:

pattern detection logic to obtain the output data from the memory device associated with the memory-side read command, to compare the output data with the set of predefined data patterns, and to determine that the output data corresponds to the read data pattern responsive to detecting a match.

4. The memory buffer device of claim 1, wherein the command controller comprises:

metadata detection logic to obtain the output data from the memory device associated with the memory-side read command, to determine that the output data is formatted as read pattern metadata, and to determine that the output data corresponds to the read data pattern responsive to detecting that the output data is formatted as the read pattern metadata.

5. The memory buffer device of claim 1, wherein the command controller comprises:

a programming interface to receive programming data for programming the set of predefined data patterns; and a pattern register for storing the set of predefined data patterns.

6. The memory buffer device of claim 1, wherein the memory buffer device further comprises:

encryption logic to encrypt at least a portion of the read response that identifies the read data pattern.

7. The memory buffer device of claim 1, wherein the host-side interface is further configured to receive, from the host device, a write-without-data command including a write memory address and write pattern metadata identifying a write data pattern from the set of predefined data patterns;

wherein the command controller is further configured to generate a memory write command to associate the write memory address with the write data pattern responsive to the write-without-data command; and wherein the memory-side interface is further configured to issue the memory write command to the memory device.

8. The memory buffer device of claim 7, wherein the command controller comprises:

pattern generation logic to obtain the write data pattern corresponding to the write pattern metadata from a pattern register, and generate the memory write command to write the write data pattern to the write memory address.

9. The memory buffer device of claim 7, wherein the command controller comprises:

metadata generation logic to obtain the write pattern metadata from the write-without-data command, and generate the memory write command to write the write pattern metadata to the memory device in association with the write memory address.

10. The memory buffer device of claim 7, wherein the write pattern metadata further identifies a length of an address range associated with the write data pattern, and wherein the memory write command associates the address range with the write data pattern.

11. The memory buffer device of claim 7, wherein the memory buffer device further comprises:

decryption logic to decrypt at least the write pattern metadata of the write-without-data command that identifies the write data pattern.

12. The memory buffer device of claim 1, wherein the memory buffer device and the memory device are separate chips mounted to a printed circuit board.

13. A memory module comprising:

a memory device including a memory array; and a memory buffer device including:

a host-side interface to receive, from a host device via a packetized serial communication link, a host-side read command including a read memory address and to output a read response to the host device via the packetized serial communication link;

a memory-side interface to communicate with the memory device, the memory-side interface including a data interface and a command/address interface; and a command controller to issue a memory-side read command including the read memory address to the memory device via the command/address interface, to receive output data from the memory device via the data interface in response to the memory-side read command, to determine if the output data corresponds to a read data pattern from a set of predefined data patterns, and to generate the read response for sending to the host device via the host-side interface as packetized serial communication data, wherein the read response includes read pattern metadata in a data packet header that identifies the read data pattern when the output data corresponds to the read data pattern, and wherein the read response includes the output data from the read memory address when the output data does not correspond to any of the set of predefined data patterns.

14. The memory module of claim 13, wherein the host-side interface comprises a serial communication link for sending packetized commands and data between the memory module and the host device.

15. A method for operating a memory buffer device, comprising:

receiving, via a host-side interface from a host device via a packetized serial communication, a host-side read command including a read memory address;

issuing from a command controller to a memory device via a command/address interface of a memory-side interface, a memory-side read command including the read memory address;

receiving output data in response to the memory-side read
command from the memory device via a data interface
of the memory-side interface;

determining, by the command controller, if the output data
corresponds to a read data pattern from a set of predefined data patterns;

generating a read response for sending to the host device
via the host-side interface as packetized serial commu-
nication data, wherein the read response includes read
pattern metadata in a data packet header that identifies
the read data pattern when the output data corresponds
to the read data pattern, and wherein the read response
includes the output data from the read memory address
when the output data does not correspond to any of the
set of predefined data patterns; and outputting the read response to the host device via the
host-side interface and the packetized serial communi-
cation link.

16. The method of claim 15, wherein the read pattern
metadata further identifies a length of the read data pattern.

17. The method of claim 15, wherein outputting the read
responses comprises:

encrypting at least a portion of the read response that
identifies the read data pattern.

* * * * *